US012601908B2

(12) United States Patent (10) Patent No.: US 12,601,908 B2
Pankratz et al. (45) Date of Patent: Apr. 14, 2026

(54) HEADS-UP DISPLAY WITH GHOST IMAGE MITIGATION

(71) Applicant: 3M INNOVATIVE PROPERTIES COMPANY, St. Paul, MN (US)

(72) Inventors: Stephan J. Pankratz, Eagan, MN (US); Matthew B. Johnson, Woodbury, MN (US); William F. Edmonds, Chavannes-des-Bois (CH); Jan Thomas Krapp, Dusseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 778 days.

(21) Appl. No.: 17/977,134

(22) Filed: Oct. 31, 2022

(65) Prior Publication Data

US 2023/0134930 A1 May 4, 2023

Related U.S. Application Data

(60) Provisional application No. 63/275,055, filed on Nov. 3, 2021.

(51) Int. Cl.
| | |
|---|---|
| *G02B 27/00* | (2006.01) |
| *B60K 35/10* | (2024.01) |
| *B60K 35/22* | (2024.01) |
| *B60K 35/23* | (2024.01) |
| *B60K 35/60* | (2024.01) |
| *G02B 5/30* | (2006.01) |
| *G02B 27/01* | (2006.01) |

(52) U.S. Cl.
CPC .......... *G02B 27/0018* (2013.01); *B60K 35/22* (2024.01); *B60K 35/23* (2024.01); *G02B 5/3083* (2013.01); *G02B 27/0101* (2013.01); *G02B 27/0149* (2013.01); *B60K 35/10* (2024.01); *B60K 35/60* (2024.01); *B60K 2360/23* (2024.01); *G02B 2027/0169* (2013.01)

(58) Field of Classification Search
None
See application file for complete search history.

(56) References Cited

U.S. PATENT DOCUMENTS

2009/0295681 A1 * 12/2009 Kaminski ......... B32B 17/10165
428/426
2024/0280809 A1 * 8/2024 Anzai ...................... G02B 5/18

* cited by examiner

*Primary Examiner* — Richard H Kim
(74) *Attorney, Agent, or Firm* — Jonathan L. Tolstedt

(57) ABSTRACT

A heads-up display for viewing by an eye of a passenger of a vehicle includes a windshield with a reflective polarizer disposed adjacent to a first outermost glass surface of the windshield, a display configured to emit an image toward the windshield, the windshield reflecting between 15% and 85% of the emitted image toward the passenger, and a phase retarding plate disposed in an optical path between the display and the windshield. The windshield is configured to receive the image emitted by the display after the image has been transmitted by the phase retarding plate and to reflect at least a portion of the received image as a reflected image toward the eye of the passenger. The phase retarding plate modifies a polarization state of the reflected image to improve a viewing characteristic of the reflective image depending on a viewing angle of the eye of the passenger.

19 Claims, 9 Drawing Sheets

Skew = 0°        Skew = 30°

Skew = 0°         Skew = 40°

Glass-Only Reflected Luminance at 40-Degree Skew, 34-Degree
Windshield Rake Angle and 1-Degree Look-Down Angle for Different
Retarder Vertical Tilt Angles ● S4 Refl w/ HWP, Skew = 40
— — S4 Refl no HWP, Skew = 40
— · — S4 Refl no HWP, Skew = 0

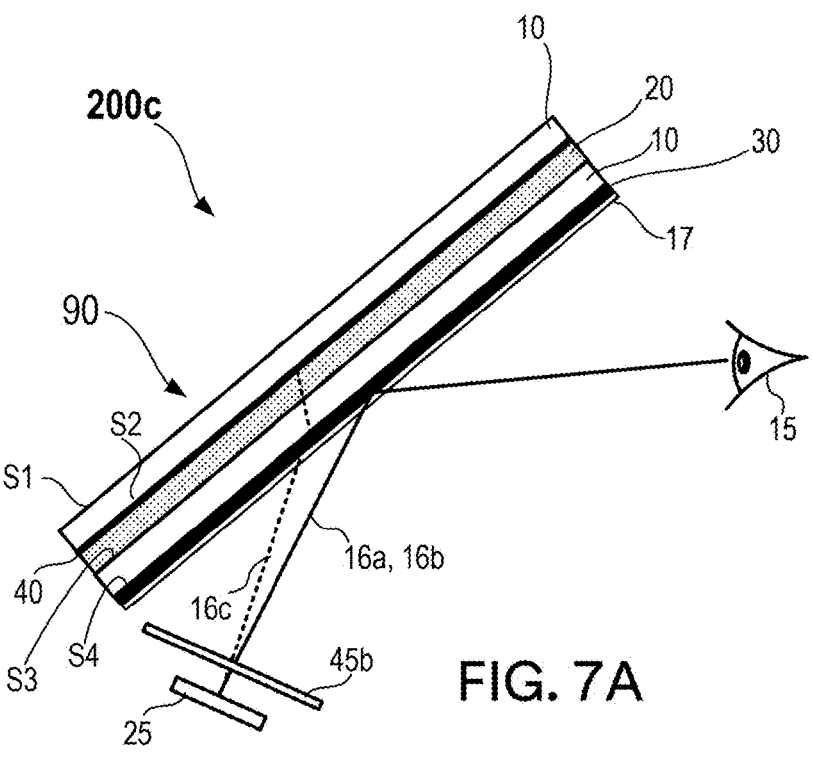
FIG. 7A
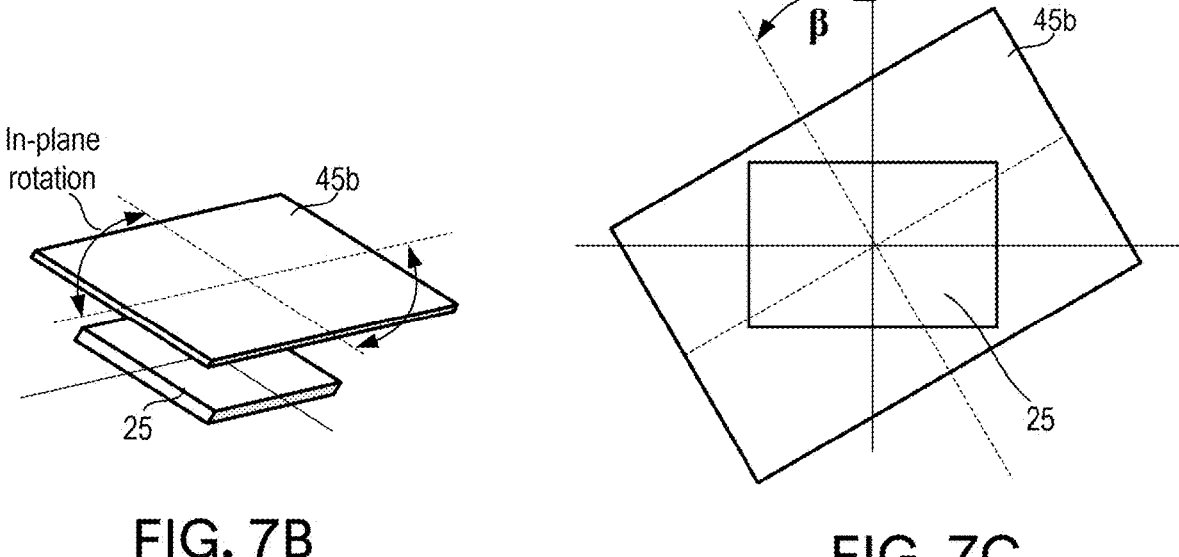
FIG. 7B
FIG. 7C

WCF Reflected Luminance Effect of Rotating Polarization via Retarder for
Passenger and Driver Viewing Position Wearing Sunglasses

HEADS-UP DISPLAY WITH GHOST IMAGE MITIGATION

SUMMARY

In some aspects of the present description, a heads-up display for viewing by an eye of a passenger of a vehicle is provided, the heads-up display including a windshield with a reflective polarizer disposed adjacent to a first outermost glass surface of the windshield, a display configured to emit an image toward the windshield, the windshield reflecting between 15% and 85% of the emitted image toward the passenger, and a phase retarding plate disposed in an optical path between the display and the windshield. The windshield is configured to receive the image emitted by the display after the image has been transmitted by the phase retarding plate and to reflect at least a portion of the received image as a reflected image toward the eye of the passenger. The phase retarding plate modifies a polarization state of the reflected image to improve a viewing characteristic of the reflective image depending on a viewing angle of the eye of the passenger.

In some aspects of the present description, a display system for viewing by first and second eyes of respective first and second passengers of a vehicle along different respective first and second directions is provided, the display system including a display configured to form a polarized image for viewing by the first and second eyes, the formed polarized image having a first polarization state, a windshield with a reflective polarizer configured to receive the formed polarized image at a first incident angle, and a retarder disposed in an optical path between the display and the windshield and configured to have its orientation relative to the reflective polarizer changed. The display system is configured to reflect between about 10% to about 60% of the received polarized image along the first and second directions as respective first and second reflected polarized images for viewing by the respective first and second eyes. The first and second reflected polarized images have respective first and second average intensities. The reflective polarizer is configured to transmit at least 60% of an incident light having a wavelength from received polarized image and having a second polarization state orthogonal to the first polarization state. The change to the retarder modifies one of the first and second average intensities by more than 20% and modifies the other one of the first and second average intensities by less than 20%.

In some aspects of the present description, a heads-up display for viewing by an eye of a passenger of a vehicle is provided, the heads-up display including a windshield with one or more glass layers, and a reflective polarizer disposed on the one or more glass layers and facing an interior of the vehicle, and a display configured to emit an image toward the windshield. The emitted image is incident on the windshield at incident angles greater than about 65 degrees. The reflective polarizer reflects between 15% and 85% of the emitted image toward the passenger. Any layer disposed on the reflective polarizer and facing the interior of the vehicle has an average thickness of less than about 7 microns.

In some aspects of the present description, a display system for viewing by first and second eyes of respective first and second passengers of a vehicle along different respective first and second directions is provided, the display system including a display configured to form a polarized image for viewing by the first and second eyes, the formed polarized image having a first polarization state, a windshield having a reflective polarizer configured to receive the formed polarized image at a first incident angle, and a retarder disposed in an optical path between the display and the windshield and configured to have its orientation relative to the reflective polarizer changed. The reflective polarizer is configured to reflect between about 10% to about 60% of the received polarized image along the first and second directions as respective first and second reflected polarized images for viewing by the respective first and second eyes. The first and second reflected polarized images have respective first and second average intensities. The reflective polarizer is configured to transmit at least 60% of an incident light having a wavelength included in the received polarized image and having a second polarization state orthogonal to the first polarization state. The change in orientation of the retarder modifies one of the first and second average intensities by a first amount and modifies the other one of the first and second average intensities by a second amount. The first amount is different from the second amount by at least 20%.

BRIEF DESCRIPTION OF THE DRAWINGS

FIGS. 7A-7C provide views of a heads-up display with a phase retarder rotated to different in-plane angles for the optimization of reflected image luminances, in accordance with an embodiment of the present description;

DETAILED DESCRIPTION

Figure 1A:
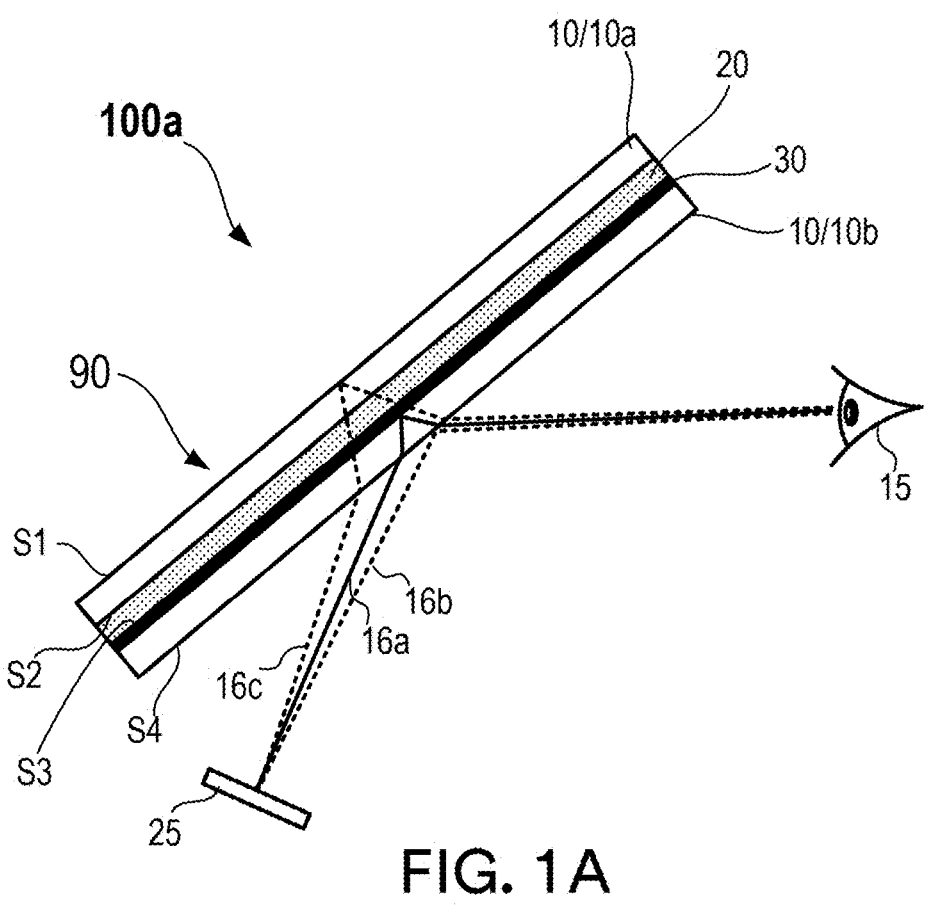
FIGS. 1A and 1B provide an illustration of a prior art heads-up display and the resulting ghost images, especially at higher viewing angles.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Heads-up displays (HUD) in vehicles typically operate by having a display embedded in/behind the dashboard which projects an image up onto the windshield of the vehicle such that image is at least partially reflected toward the eye of a passenger (e.g., the driver of the vehicle), while still maintaining a required visibility level of the environment and objects outside the vehicle. Unfortunately, in certain circumstances, the passenger may see multiple reflections, a main reflection and one or more ghost images offset from the main reflection. For example, light from the emitted image may be reflected off of both the front and back surfaces of a windshield, creating two images of varying intensity slightly offset from each other. If a windshield is constructed of multiple layers, including outer glass layers, adhesive layers, etc., the passenger may see several different ghost images that can affect the visual quality of the intended image.

One solution that addresses some of the ghosting is the use of a Windshield Combiner Film (WCF) placed between two outer layers of glass. The WCF is a type of reflective polarizer designed to be installed in a windshield and to reflect p-polarized light from the HUD toward the viewer. Because the layer interfaces of a normal windshield typically reflect s-polarized light, changing the display to emit p-polarized light in combination with the embedded WCF means that only one main reflection (the reflection of the p-polarized image from the WCF) makes it back to the viewer, and all other ghost reflections are greatly reduced for viewing at low skew angles (e.g., straight on viewing). For the purposes of this specification, the terms "skew angle" and "viewing angle" shall be considered to be synonymous and interchangeable.

However, for wider viewing angles (e.g., skew angles of 30 degrees and higher), ghosting can still be an issue even with WCF. For example, an LCD-in-dash wide-format HUD application (e.g., where the display and active, reflecting area of the windshield are wide enough to project images directly in front of different passengers) can involve simultaneous head-on and skew angle viewing conditions for the front-seat passenger and driver, respectively, presenting challenges for a polarization-based system such as WCF. When viewing a HUD image straight-on or nearly so, the main image seen will be the p-polarized image light reflected by the WCF. However, when the same HUD mage is viewed at a wide viewing angle (such as a driver looking at an image displayed in front of a front-seat passenger), the image light will contain some components of s-polarized light because of the wide viewing angle, and so the driver may get some s-polarized (ghost) components reflecting off the glass interfaces, as well as at least some p-polarized light from the main image (because of the wide angle, the intensity of the main image will be reduced at wide angles, as well.)

According to some aspects of the present description, a heads-up display is configured to reduce ghost images and improve image intensity especially for images seen at large viewing angles (large skew angles). In some embodiments, a heads-up display for viewing by an eye of a passenger of a vehicle includes a windshield with a reflective polarizer disposed adjacent to a first outermost glass surface of the windshield, a display configured to emit an image toward the windshield, the windshield reflecting between 15% and 85% of the emitted image toward the passenger, and a phase retarding plate (e.g., a half-wave plate/retarder) disposed in an optical path between the display and the windshield. In some embodiments, the windshield may be configured to receive the image emitted by the display after the image has been transmitted by the phase retarding plate and to reflect at least a portion of the received image as a reflected image toward the eye of the passenger. In some embodiments, the phase retarding plate may modify a polarization state of the reflected image to improve a viewing characteristic of the reflective image depending on a viewing angle of the eye of the passenger. In some embodiments, the viewing angle of the eye of the passenger may be greater than or equal to about 20, or about 25, or about 30, or about 35, or about 40, or about 45 degrees.

It should be noted that saying the reflective polarizer is disposed "adjacent" to a first outermost glass surface of the windshield does not necessarily mean the reflective polarizer is directly adjacent or touching the first outermost glass surface. For example, in some embodiments of the heads-up display, the reflective polarizer may be disposed between the first outermost glass surface of the windshield and an opposing, second outermost glass surface of the windshield. In other embodiments, the reflective polarizer may be disposed adjacent to the first outermost glass surface of the windshield, facing away from an opposing, second outermost glass surface of the windshield (e.g., on the surface of the windshield facing an interior of the vehicle). In some embodiments, the heads-up display may further include a first bonding layer (e.g., an adhesive layer) bonding the reflective polarizer to the first outermost glass surface. In such embodiments, the heads-up display may further include an additional layer (e.g., a protective, hard-coat layer) disposed on the reflective polarizer and facing an interior of the vehicle. In such embodiments, the additional layer may have an average thickness of less than about 7 microns, or about 5 microns, or about 4 microns, or about 3 microns, or about 2 microns, or about 1 micron.

In some embodiments, the phase retarding plate may be a half wave plate. In some embodiments, the phase retarding plate may be disposed in a plane substantially parallel to the display and rotating the phase retarding plate within the plane changes the viewing characteristic of the reflected image. In such embodiments, the plane may be directly adjacent the front surface of the display. In other embodiments, tilting a first end of the phase retarding plate at different angles respective to the plane of the display (tilting it up out of the plane instead of rotating it within the plane) changes the viewing characteristic of the reflected image. In some embodiments, the optical characteristic may be a brightness of the reflected image. In some embodiments, the optical characteristic may be an amount of unwanted ghosting of the reflected image.

In some embodiments, the windshield of the heads-up display may further include a light absorbing layer (e.g., a black, printed layer, band, or frit) disposed between, and spaced apart from, the first and second outermost major glass surfaces of the windshield. In some embodiments, the purpose of this light absorbing layer may be to prevent or significantly reduce a ghost image reflection from one or more surfaces or interfaces within the windshield.

According to some aspects of the present description, a display system for viewing by first and second eyes of respective first and second passengers of a vehicle along different respective first and second directions includes a display configured to form a polarized image for viewing by the first and second eyes, the formed polarized image having a first polarization state (e.g., p-polarized light), a windshield with a reflective polarizer configured to receive the formed polarized image at a first incident angle, and a retarder disposed in an optical path between the display and the windshield and configured to have its orientation relative to the reflective polarizer changed. In some embodiments, the display system may be configured to reflect between about 10% to about 60% of the received polarized image along the first and second directions as respective first and second reflected polarized images for viewing by the respective first and second eyes. In some embodiments, the first and second reflected polarized images may have respective first and second average intensities. In some embodiments, the reflective polarizer may be configured to transmit at least 60% of an incident light having a wavelength from the received polarized image and having a second polarization state orthogonal to the first polarization state.

In some embodiments, the change in orientation of the retarder may modify one of the first and second average intensities by more than 20% and may modify the other one of the first and second average intensities by less than 20%. In some embodiments, the change in orientation of the reflective polarizer may modify one of the first and second average intensities by more than 30% and may modify the other one of the first and second average intensities by less than 10%. In some embodiments, the change in orientation of the reflective polarizer may increase one of the first and second average intensities by more than 30% and may decrease the other one of the first and second average intensities by less than 10%. In some embodiments, changing the orientation of the retarder relative to the reflective polarizer may include rotating the retarder within a plane of the retarder (e.g., a plane substantially parallel to a plane of the display).

In some embodiments, the display system may be a wide-format heads-up display. In some embodiments, one of the first and second passengers in a driver of the vehicle, and the other of the first and second passengers is a non-driving passenger (e.g., someone sitting in a front passenger seat). In some embodiments, the first average intensity may be an average intensity for the driver, and the second average intensity may be an average intensity for the passenger. In such embodiments, the change in orientation of the reflective polarizer may increase the first average intensity (for the driver) by more than 20%, or more than 25%, or more than 30%, or more than 35%, and may decrease the second average intensity (for the non-driving passenger) by less than about 20%, or less than about 15%, or less than about 10%.

In some embodiments, the reflective polarizer may be disposed on a first major outermost surface of the windshield facing an interior or the vehicle. In such embodiments, an additional layer (e.g., a hard-coat layer or other protective layer) may be disposed on the reflective polarizer and may face an interior of the vehicle. In some embodiments, this additional layer may have an average thickness of less than about 7 microns, or about 5 microns, or about 4 microns, or about 3 microns, or about 2 microns, or about 1 micron.

According to some aspects of the present description, a heads-up display for viewing by an eye of a passenger of a vehicle includes a windshield with one or more glass layers, and a reflective polarizer disposed on the one or more glass layers and facing an interior of the vehicle, and a display configured to emit an image toward the windshield. The emitted image is incident on the windshield at incident angles greater than about 65 degrees. In some embodiments, the reflective polarizer reflects between 15% and 85% of the emitted image toward the passenger as a reflected image. In some embodiments, any layer disposed (e.g., a protective layer) on the reflective polarizer and facing the interior of the vehicle may have an average thickness of less than about 7 microns, or about 5 microns, or about 4 microns, or about 3 microns, or about 2 microns, or about 1 micron. In some embodiments, the passenger may be a driver of the vehicle. In some embodiments, the passenger may be viewing the reflected image at a high skew angle (i.e., a high viewing angle), such as a driver viewing an image that is being displayed in front of a front-seat passenger. In some embodiments, the heads-up display may be a wide-format heads-up display (e.g., a display or combination of displays providing a wide active area and capable of creating a corresponding wide reflected image on the windshield.)

According to some aspects of the present description, a display system for viewing by first and second eyes of respective first and second passengers of a vehicle along different respective first and second directions may include a display configured to form a polarized image for viewing by the first and second eyes, the formed polarized image having a first polarization state, a windshield having a reflective polarizer configured to receive the formed polarized image at a first incident angle, and a retarder disposed in an optical path between the display and the windshield and configured to have its orientation relative to the reflective polarizer changed. In some embodiments, the reflective polarizer may be configured to reflect between about 10% to about 60% of the received polarized image along the first and second directions as respective first and second reflected polarized images for viewing by the respective first and second eyes. In some embodiments, the first and second reflected polarized images have respective first and second average intensities. In some embodiments, the reflective polarizer may be configured to transmit at least 60% of an incident light having a wavelength included in the received polarized image and having a second polarization state orthogonal to the first polarization state. In some embodiments, the change in orientation of the retarder may modify one of the first and second average intensities by a first amount and may modify the other one of the first and second average intensities by a second amount. In some embodiments, the first amount is different from the second amount by at least 20%, or at least 25%, or at least 30%, or at least 35%, or at least 40%, or at least 50%, or at least 75%, or at least 90%. In some embodiments, changing the orientation of the retarder may increase one of the first and second average intensities by a first amount and may decrease the other of the first and second average intensities by a different second amount. In some embodiments, one of the first and second amounts may be a positive value, and the other of the first and second amounts may be a negative value. In some embodiments, the orientation of the retarder may be used to selectively "tune" a reflected image to be more visible for the first eyes (e.g., for a first passenger), and to be less visible for the second eyes (e.g., for a second passenger). For example, information in some images may be targeted for a driver, and less important for a passenger, or vice versa. In some embodiments, the orientation of the retarder may be actively changed to change one or more optical characteristics of the reflected images based on viewing angle.

Figure 1B:
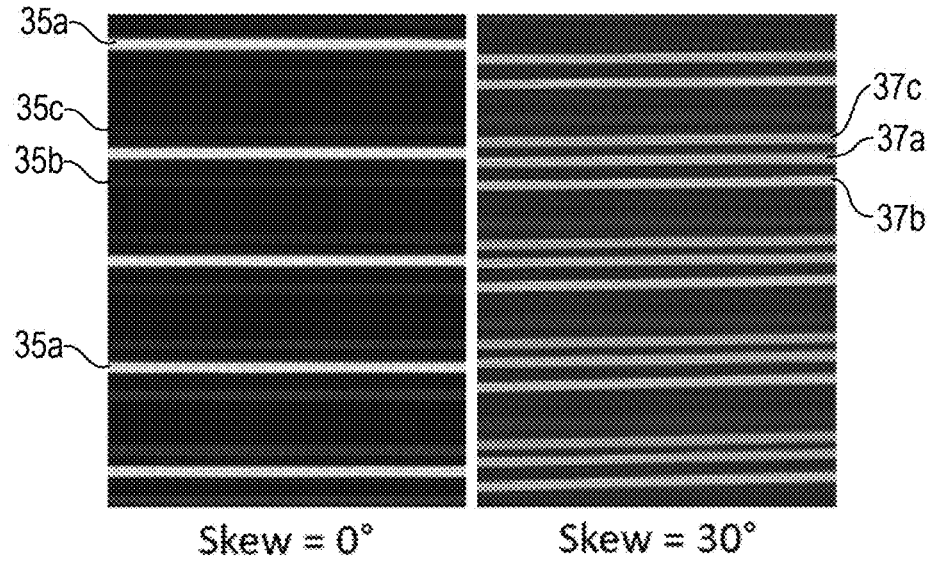

Turning now to the figures, FIGS. 1A and 1B provide an illustration of a prior art heads-up display and the resulting ghost images that can be seen, especially at higher viewing angles (higher skew angles). FIG. 1A shows a heads-up display 100a which typically includes a layered windshield 90 with two outermost glass layers 10, glass layer 10a facing the exterior of the vehicle, and glass layer 10b facing an interior of the vehicle. Outermost glass layers 10 may be held together by a filler layer 20 which is substantially optically clear and binds the glass layers 10 together. For example, in some embodiments, filler layer 20 may be include a resin such as polyvinyl butyral (PVB). Each of the outermost glass layers 10 has both an outermost surface (facing out away from the windshield for 10a or facing into the interior of the vehicle for 10b) and an innermost surface (embedded within the windshield). For the purposes of discussion, the surfaces of outermost glass layers 10 are labeled as shown in FIG. 1A, and as described here:

S1 is the exterior surface of outermost glass layer 10a, facing toward the open air outside the vehicle (the exterior surface of windshield 90).

S2 is the interior surface of the outermost glass layer 10a, facing filler layer 20.

S3 is the interior surface of the outermost glass layer 10b, facing filler layer 20.

S4 is the exterior surface of outermost glass layer 10b, facing the interior of the vehicle.

These labels S1 through S4 shall be used in this specification to refer to the different surfaces of the outermost glass layers 10 (10a/10b) for both the prior art systems and embodiments of systems as described herein.

Heads-up display system 100a also includes a display 25 which creates and emits images at light rays 16 (including rays 16a, 16b, and 16c). Light rays 16 are then reflected off windshield 90 toward the eye of a passenger 15. However, light rays 16 may be at least partially reflected by any interface between air and an outermost glass layer 10, including the S1 surface and the S4 surface. As the S1 surface and S4 surface have a physical separation between them, light rays 16c reflecting off the S1 surface will arrive at the eye of the passenger 15 with a slightly different angle than light rays 16b which are reflected from the S4 surface, creating two separate images that are offset from each other. This effect is called "ghosting" (two or more overlapping images) and can make the image that was intended to be viewed by passenger 15 difficult to read, especially while operating a vehicle.

In typical heads-up display systems, display 25 may emit light of a first polarization type, such as S-polarized light. S-polarized light is reflected by the glass surfaces of a windshield as described above, while light of an opposing, second polarization type (i.e., P-polarized light) is substantially transmitted (not reflected) by the glass surfaces. As already discussed, using light of the first, S-polarized type enables the heads-up display to work (reflecting the image emitted by the display to the eye of the viewer) but can lead to ghosting because of the reflections off of the S1 and S4 glass surfaces. One way to combat this ghosting is to change display 25 to emit P-polarized light instead of S-polarized light, and adding a reflective polarizer 30 in between the outermost glass surfaces 10a and 10b, and adjacent filler layer 20 (i.e., on surface S2 or S3). If the reflective polarizer 30 is configured to reflect at least a portion of P-polarized light, and typical windshields substantially transmit (pass) P-polarized light, then only light rays 16a, which are reflected from the reflective polarizer 30, are seen by the eye of the passenger 15. It should be noted that reflective polarizer 30 may be configured to be a weak reflective polarizer, reflecting only a portion of the P-polarized light back to the eye of the passenger 15 (in order that the image seen by the passenger 15 is not overwhelmingly bright compared to the surrounding environment as seen through windshield 90).

FIG. 1B shows an image of a series of horizontal lines 35a as they may appear to a passenger 15 seeing the images through heads-up display 100a of FIG. 1A. The image on the left side of FIG. 1B shows what a passenger 15 may see on the heads-up display 100a when they are viewing the image substantially straight on (i.e., at a skew angle substantially equal to zero). At a skew angle of 0 degrees, passenger 15 can clearly see horizontal lines 35a of the pattern, with little to no ghosting. The left-hand image of FIG. 1B shows very minor, virtually imperceptible ghost images 35b and 35c, caused by reflections of the image from surfaces S1 and S4 of windshield 90 (e.g., maybe caused by light imperfectly polarized by the system, or minor imperfections in windshield 90).

In contrast, when the skew angle is significantly larger (such as a skew angle of 30 degrees, as shown in the right-hand image of FIG. 1B), the passenger 15 will again see strong ghost images 37b and 37c along with the intended image 37a. This is because the P-polarized image rays 16 are best viewed with little to no skew angle (viewing angle), and when viewing the same image from a significant skew angle, components of S-polarized light are added to the P-polarized light as the skew angle increases (i.e., at angle, the polarization type begins to "rotate" to include S-polarized light). Therefore, a passenger at a high skew angle (e.g., a driver looking at an image displayed for a front-seat passenger) will see the image 37a (reflected from reflective polarizer 30 and often less intense than the same image seen at zero skew) and ghost images 37b and 37c created by the S-polarized components reflected from surface S1 and surface S4. This situation may occur, for example, when the heads-up display 100a is a wide-format LCD-in-dash heads-up display where the emitting display 25 extends across a significant portion of the width of windshield 90 (see, for example, FIG. 4 herein).

Figure 2A:
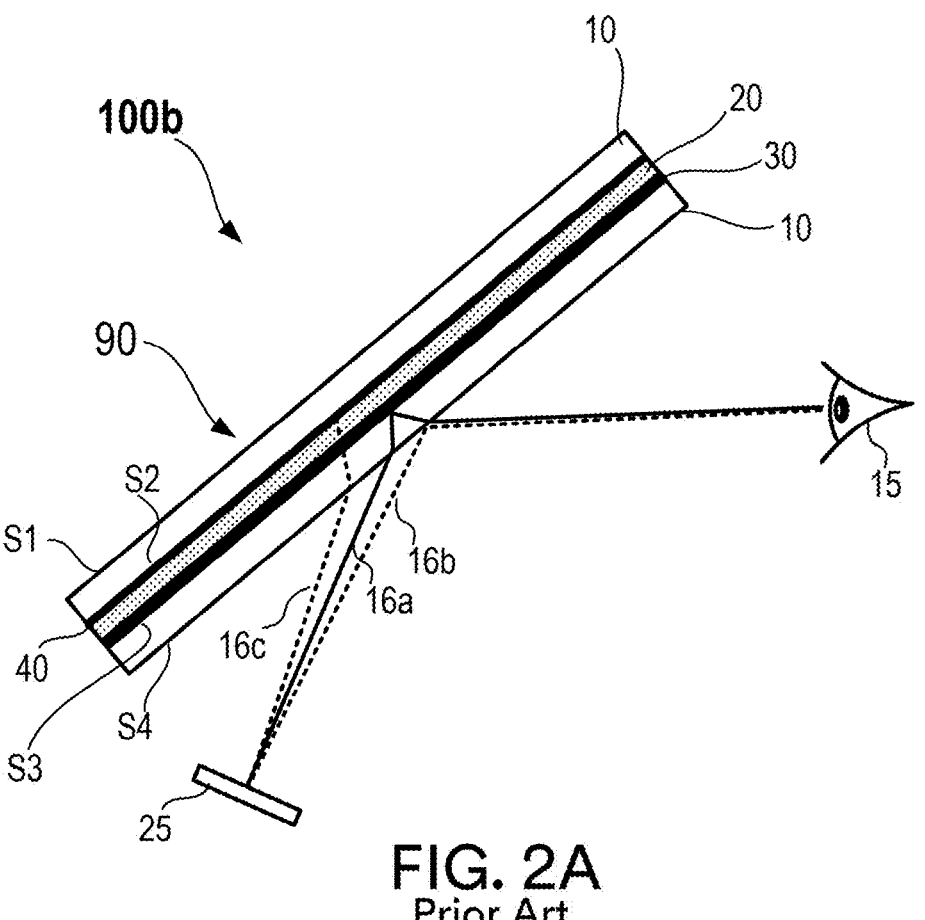
FIGS. 2A and 2B provide an illustration of another prior art heads-up display and the resulting ghost images, especially at higher viewing angles.
Figure 2B:
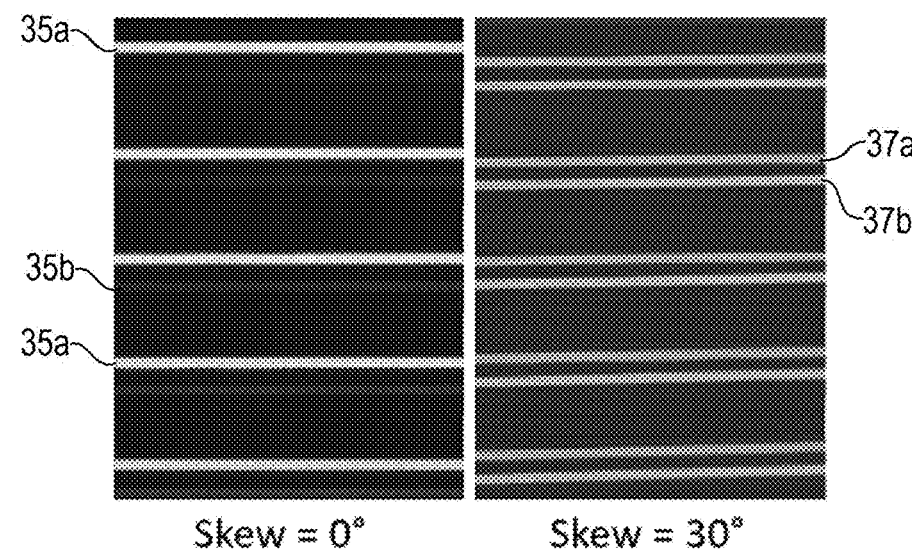

In some existing systems, such as heads-up display 100b shown in FIG. 2A, an additional light-absorbing layer 40 may be added to help eliminate ghosting from surface S1 seen at high skew angles. It should be noted that the labeled components of FIGS. 2A and 2B are identical in function to like-numbered components in FIGS. 1A and 1B unless noted otherwise. For this reason, additional description of the like-numbered components is not provided, and the descriptions previously provided herein shall apply equally to these like-numbered components.

Light-absorbing layer 40 may be, for example, a black, printed layer or a polymeric band or frit. As shown in FIG. 2A, including light-absorbing layer 40 helps absorb light 16c that otherwise would have made it to, and be reflected from, the S1 surface of windshield 90. The effect of this can be seen in the right-hand image of FIG. 2B, which shows that one of the ghost images (e.g., image 37c as shown in FIG. 1B) has been substantially reduced or eliminated, as light rays 16c are substantially absorbed by light-absorbing layer 40 before reaching surface S1. It should be noted that, as light-absorbing layer 40 is substantially opaque to light, it would typically be used only in a small area of the windshield 90 (e.g., a narrow region across the bottom of the windshield) where it will not interfere with the passenger's view of the environment outside the vehicle. It should also be noted that, while the light-absorbing layer 40 can be used to eliminate the 37c ghost image at high skew angles, there is still a ghost image 37b reflected from the interior S4 surface of the windshield 90.

Figure 3A:
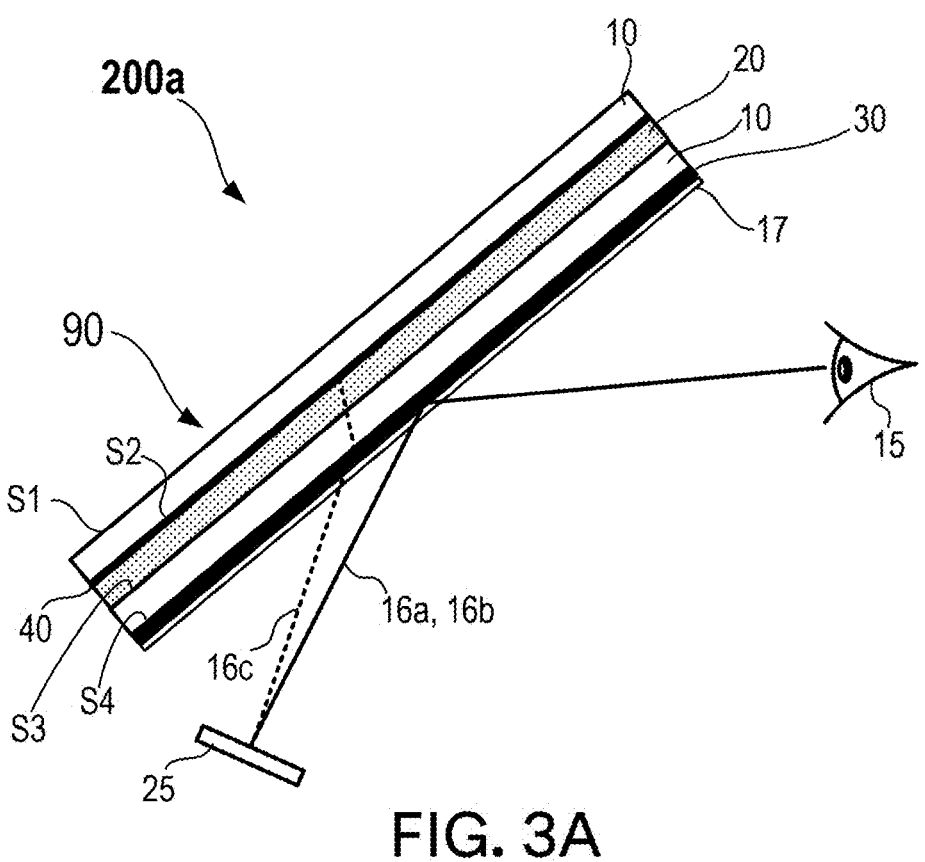
FIGS. 3A and 3B show a heads-up display for the reduction of ghost images, in accordance with an embodiment of the present description.
Figure 3B:
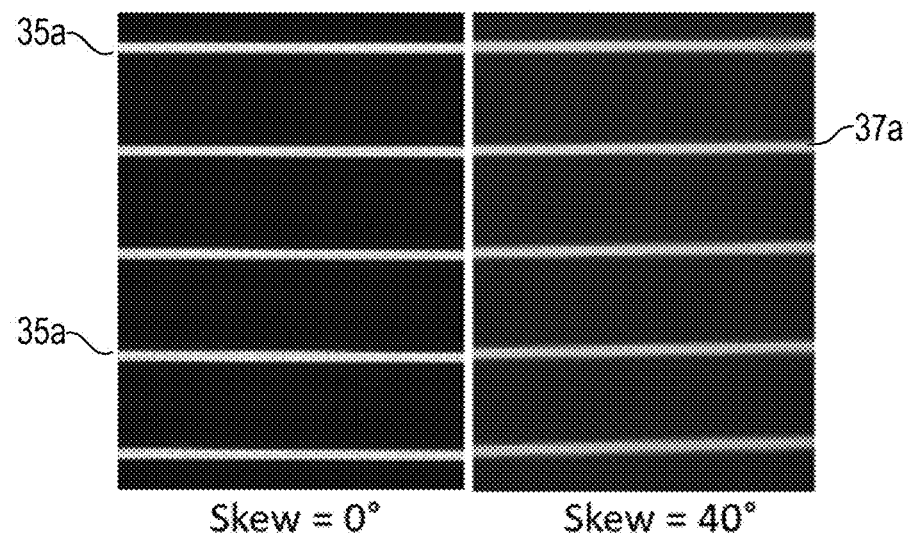

FIG. 3A represents an improvement over the prior art systems. As with FIGS. 2A and 2B, the labeled components of FIGS. 3A and 3B are identical in function to like-numbered components in FIGS. 1A and 1B, as well as those in FIGS. 2A and 2B, unless noted otherwise. Additional description of the like-numbered components is not provided, and the descriptions previously provided herein shall apply equally to these like-numbered components.

In FIG. 3A, heads-up display 200a includes a reflective polarizer 30 that is disposed on the S4 surface of windshield 90, rather than on either the S2 or S3 surfaces within windshield 90. Because of this arrangement, light rays 16 are reflected by reflective polarizer 30 before entering into windshield 90. This arrangement eliminates the reflections from surface S4 (see light rays 16*b* in FIG. 2A). In at least some embodiments, heads-up display 200*a* also relies on light-absorbing layer 40 disposed adjacent the S2 surface of windshield 90 to eliminate or substantially eliminate the reflections from the S1 surface by substantially absorbing light rays 16*c* that pass into windshield 90. In some embodiments, an additional layer 17 (e.g., a hard-coat layer or other protective layer) may be disposed on reflective polarizer 30. However, in such embodiments, this additional layer 17 may be thin enough such that any surface reflections from layer 17 (creating potential new ghost images) are so close to the main image as to be imperceptible. For example, in some embodiments, additional layer 17 may be less than 7 microns, or less than 5 microns, or less than 4 microns, or less than 3 microns, or less than 2 microns, or less than 1 micron thick.

As can be seen in FIG. 3B, image 35*a* as seen at a low or zero skew angle (on the left-hand side of FIG. 3B) is very similar to the image 37*a* seen at a high skew angle such as 40 degrees (on the right-hand side of FIG. 3B).

Figure 4:
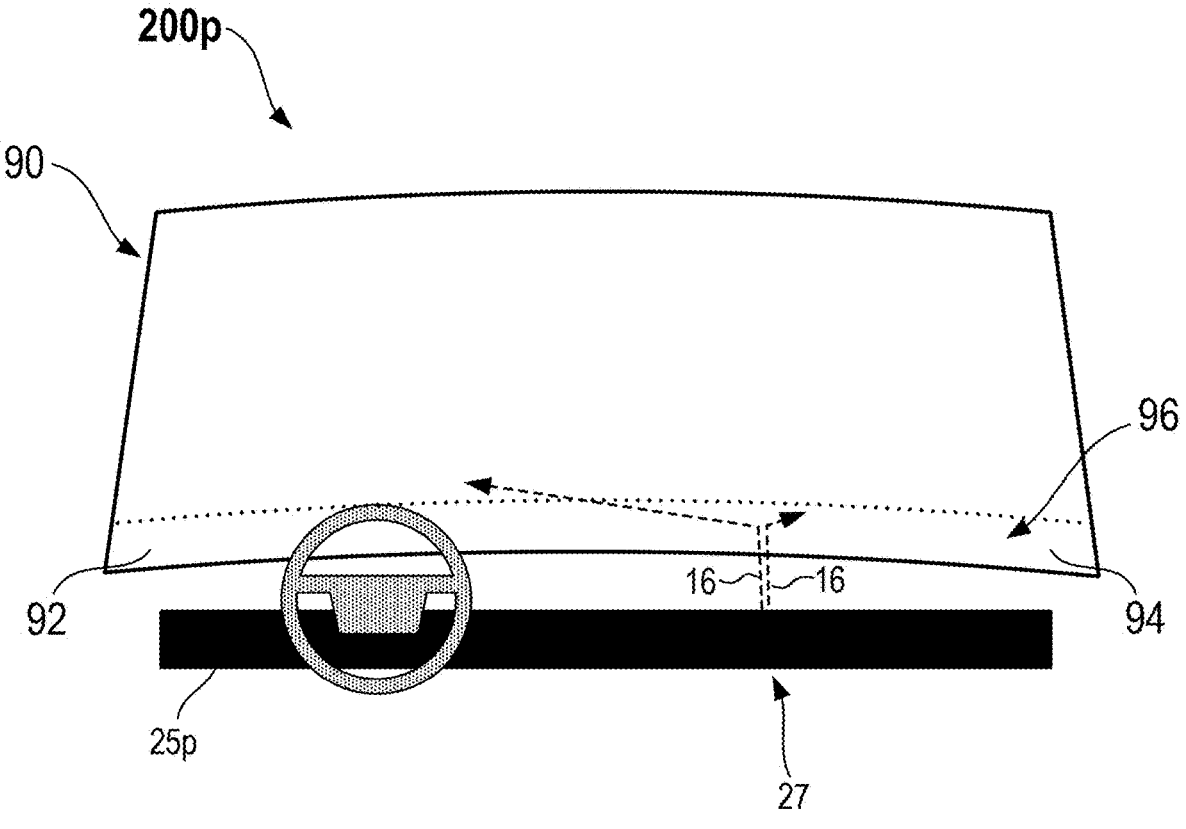
FIG. 4 is an illustration of a wide-format heads-up display, in accordance with an embodiment of the present description.

FIG. 4 is an illustration of a wide-format heads-up display in which significantly different viewing angles may occur and is provided for reference. In wide-format heads-up display 200*p*, the display 25*p* may extend across a significant portion of the width of windshield 90. A portion 96 of windshield 90 (e.g., a lower portion, as shown in FIG. 4) may be reserved for the reflected images created by image light rays 16 emitted by extended display 25*p*. In some embodiments, the lower portion 96 of windshield 90 may substantially define the region which a light-absorbing layer (e.g., light-absorbing layer 40 of FIG. 3A) would cover, in those embodiments using such a light-absorbing layer (i.e., the light-absorbing layer may only need to cover the portion 96 of windshield 90 from which the HUD images will be reflected). Because the display 25*p* and windshield portion 96 may extend across a significant portion of windshield 90, images may be displayed in portion 96 closer to a driver-side 92 of windshield 90 (i.e., closer to the driver) or closer to passenger-side 94 of windshield 90 (i.e., closer to the front-seat passenger). If an image is emitted at a location 27 of display 25*p*, closer to the passenger-side 94 (for example), such that a driver of the vehicle views the image at a significant viewing or skew angle, and a passenger in the front seat (not driving) may view the image substantially head-on, or at least at a very low skew angle. Embodiments described herein may be used to "tune" a displayed image for best viewing by the driver, or by the front-seat passenger, or to optimize the displayed image for viewing at both passenger positions. Specifically, the embodiments shown in FIGS. 5 and 7 herein utilize a phase retarder (e.g., a half-wave plate) positioned within the optical path between the display and the windshield to modify the polarization state of image light emitted by the display so that it is best viewed by one or both passenger positions (i.e., by driver and/or front-seat passenger).

Figure 5:
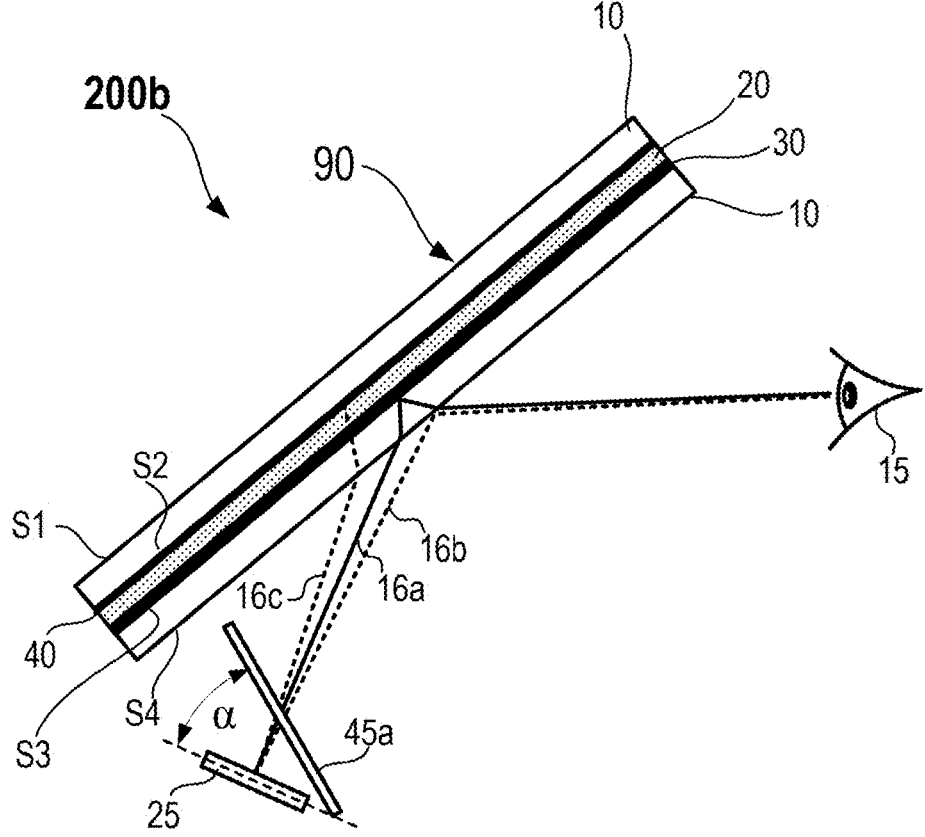
FIG. 5 is a side view of a heads-up display with a phase retarder positioned at different tilt angles for the reduction of ghost images, in accordance with an embodiment of the present description.

FIG. 5 is a side view of a heads-up display with a phase retarder positioned at different tilt angles for the reduction of ghost images, according to an embodiment of the present description. Heads-up display 200*b* represents an improvement over the prior art system 100*b* shown in FIG. 2. Accordingly, the labeled components of FIG. 5 are identical in function to like-numbered components in FIG. 2A unless specifically noted otherwise, and the descriptions previously provided herein shall apply equally to these like-numbered components.

The configuration of the windshield 90 in heads-up display 200*b* is similar to that of heads-up display 100*b* in FIG. 2. In some embodiments, windshield 90 includes two outermost glass layers 10, sandwiching a filler layer (e.g., a resin or PVB layer) 20. In some embodiments, a reflective polarizer 30 is disposed on surface S3 of windshield 90 (e.g., between filler layer 20 and the glass layer 10 facing the interior of the vehicle). In some embodiments, a light-absorbing layer 40 may be disposed on or adjacent to surface S2 of windshield 90.

In some embodiments of heads-up display 200*b*, a phase retarding plate, or retarder (e.g., a half-wave plate) 45*a* is disposed in an optical path between display 25 and windshield 90. In an operational scenario where both the driver and the front-seat passenger are to view the displayed image (e.g., an image projected by a wide-format HUD onto a location on the windshield that is substantially straight-on viewing for the front-seat passenger), the output polarization field can be "tuned" using retarder 45*a* such that it is optimal for both the image rays reflecting toward the front-seat passenger as well as those reflecting toward the driver. In some embodiments, retarder 45*a* is oriented so that its optical axis is aligned for straight-on viewing (i.e., for the front-seat passenger in this scenario) but is effectively rotated to some degree relative to the light ray direction and polarization for viewing at a high-skew angle. In some embodiments, retarder 45*a* is tilted by some angle α out of a plane parallel to the emitting surface of the display 25 (e.g., one end is lifted or lowered relative to the plane of the display 25) about a horizontal axis that is orthogonal to the output rays 16 (e.g., ray 16*a*) for the front-seat passenger. From the straight-on viewing position (e.g., the front-seat passenger), tilting the retarder 45*a* in this manner has very little impact on the light rays 16 as seen by the front-seat passenger, who sees the intended image with little to no ghosting. For a high viewing (skew) angle (e.g., the driver), the tilted retarder 45*a* provides a significant reduction in the ghost image reflected by the S4 surface of windshield 90, because the polarization of the light rays 16 reaching the driver at a higher skew angle have had their rotation rotated back toward P-polarization at this skew angle. This embodiment may also result in a slight drop in luminance for the intended image reflected from reflective polarizer 30, as viewed at the higher skew angle.

Figure 6:
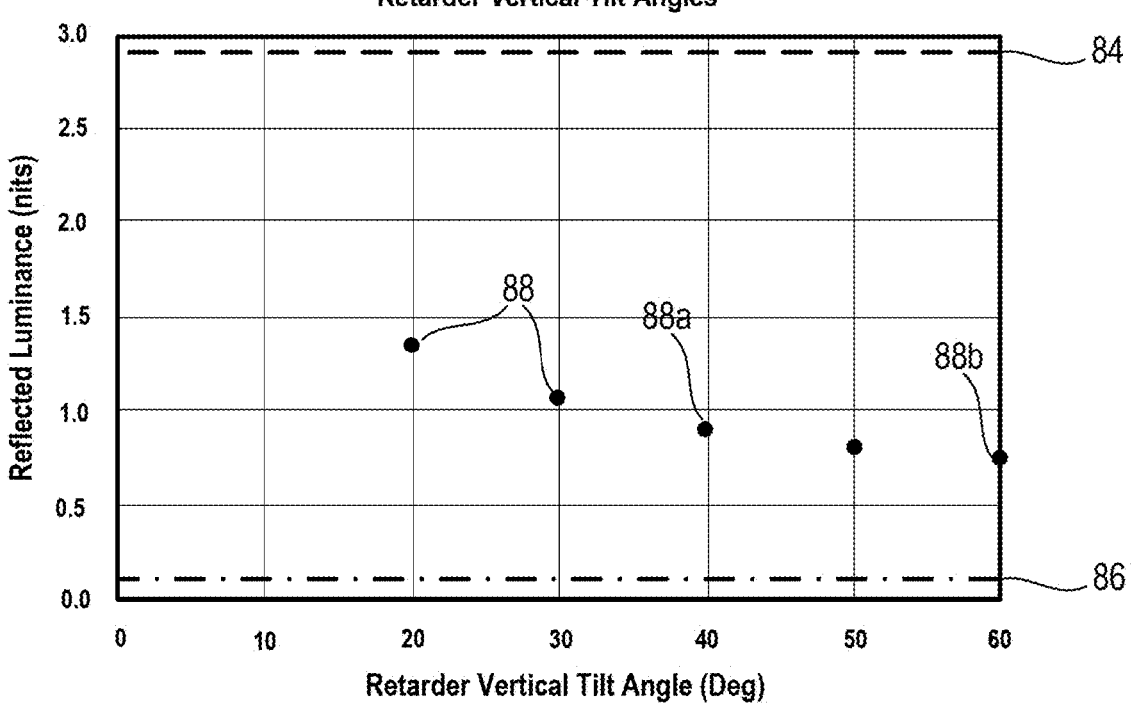
FIG. 6 is a chart showing how tilting of a phase retarder can adjust reflected luminance levels in the heads-up display of FIG. 5, in accordance with an embodiment of the present description.

FIG. 6 is a chart illustrating how tilting of phase retarder 45*a* of heads-up display 200*b* of FIG. 5 may be used to adjust reflected luminance levels. The reflection off the S4 glass surface (i.e., the S4 ghost image) was measured for a range of tilt angles of retarder 45*a*, and the results are shown in the plot of FIG. 6. Plotline 84 represents the level of S4 reflection as measured in nits at a high skew angle (i.e., a viewing angle of 40 degrees) and without retarder 45*a*. Plotline 86 represents the level of S4 reflection seen when viewed substantially straight on (i.e., a viewing angle of 0 degrees, as seen by the front-seat passenger), also without retarder 45*a*. Finally, the series of plot points 88 represents the S4 reflection seen at a skew angle of 40 degrees for various angles of tilt for the retarder 45*a*. For example, at a 40-degree tilt angle for retarder 45*a* (plot point 88*a*), the luminance of the S4 ghost image is about 0.9 nits, and for a 60-degree tilt angle for retarder 45*a* (plot point 88*b*), the S4 ghost image luminance is about 0.75 nits. These reduced luminance levels measured with retarder 45*a* in place can be compared to the luminance levels shown by plotline 84 when the retarder 45*a* is not used. It should be noted that the data shown in FIG. 6 assumes a rake angle of the windshield of about 34 degrees and a 1-degree "look down" angle (i.e., the viewer is looking down at the images at about 1 degree below horizontal).

FIGS. 7A-7C provide views of an alternate embodiment of a heads-up display with a phase retarder rotated to different in-plane angles for the reduction of ghost images or the tuning of reflected image luminance as seen by viewers in different positions. FIG. 7A is a side view of a heads-up display 200c with a phase retarder disposed in a plane that is substantially parallel to a plane of the emitting surface of display 25. Heads-up display 200c is a variation of system 200a shown in FIG. 3A. Accordingly, the labeled components of FIG. 7A are identical in function to like-numbered components in FIG. 3A unless specifically noted otherwise, and the descriptions previously provided herein shall apply equally to these like-numbered components.

In some embodiments, heads-up display 200c includes windshield 90 where, similar to windshield 90 of FIG. 3A, reflective polarizer 30 is disposed on the S4 surface. In some embodiments, an additional, protective layer 17 may be disposed on top of at least a portion of reflective polarizer 30. A light-absorbing layer 40 may be disposed adjacent the S2 interior surface for the purpose of absorbing any light rays 16c that may enter windshield 90 before they reach (and reflect from) the S1 surface. All other light rays 16a, 16b are reflected from reflective polarizer 30 toward the eye of passenger 15.

In some embodiments, heads-up display 200c includes a retarder 45b (e.g., a half wave plate) which is disposed in a plane adjacent to and substantially parallel to a plane of the emitting surface of display 25. In some embodiments, retarder 45b may be disposed essentially on the display 25 (e.g., in contact with or nearly in contact with display 25). In the embodiment of FIG. 7A, the optical characteristics (e.g., luminance, ghosting, etc.) of heads-up display 200c may be "tuned" by rotating retarder 45b within its plane (as opposed to tilting the retarder out of its plane as was described for retarder 45a in heads-up display 200b of FIG. 5) by some angle β. Additional views showing the rotation of retarder 45b relative to display 25 are provided in FIGS. 7B and 7C. In the embodiment 200c of FIG. 7A, the combination of moving reflective polarizer 30 to the S4 surface and absorbing light before it reaches the S1 surface interface effectively reduces the ghost images seen by the driver. In addition, rotating retarder 45b in-plane allows the system to be optimally configured for either passenger (i.e., driver or front-seat passenger) or both, as described in FIGS. 8 and 9.

Figure 8:
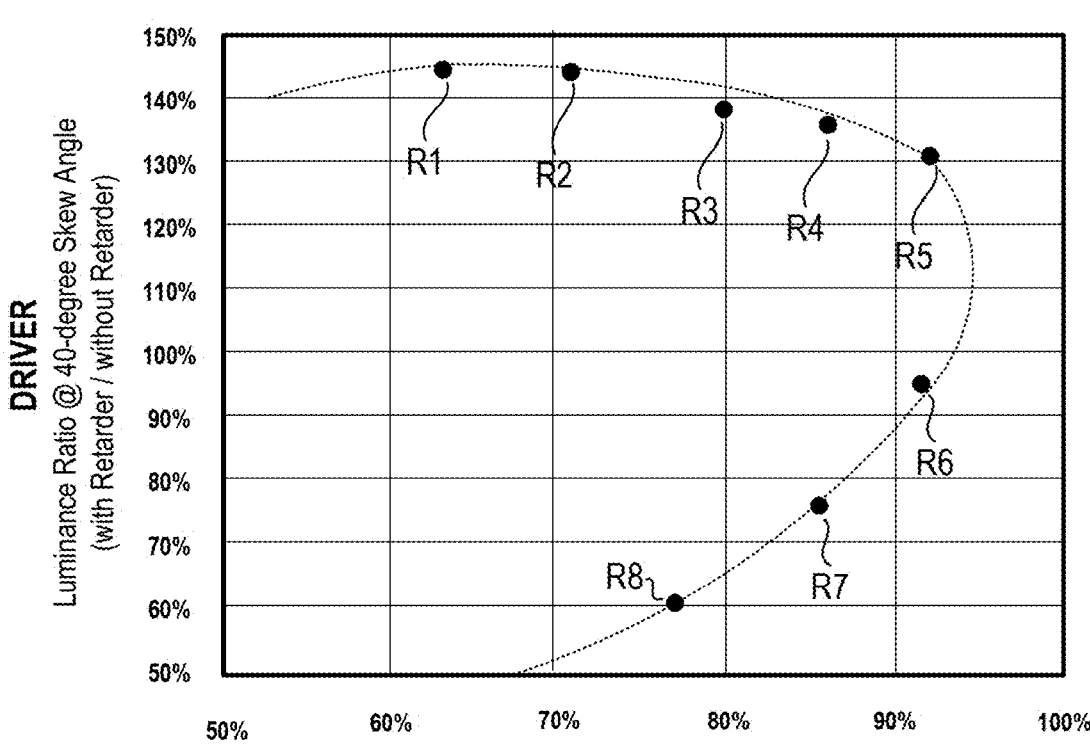
FIG. 8 is a chart showing how rotation of a phase retarder can adjust reflected luminance levels in the heads-up display of FIG. 7A, in accordance with an embodiment of the present description.
Figure 9:
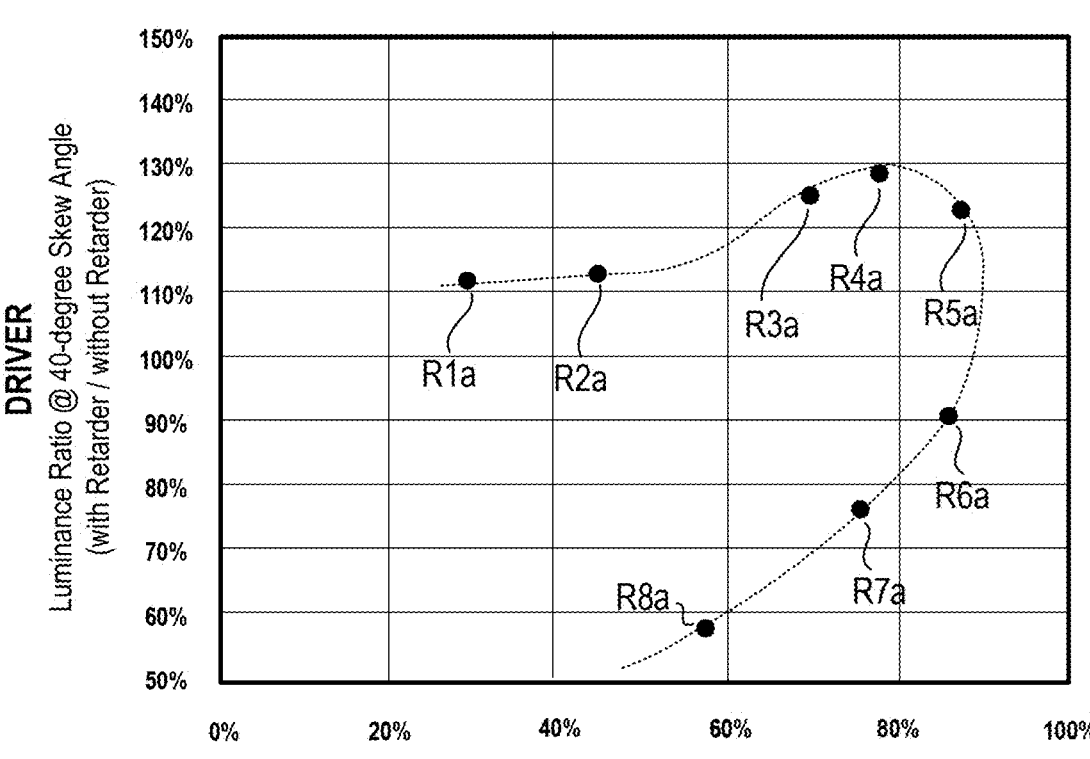
FIG. 9 is a chart showing how rotation of a phase retarder can adjust reflected luminance levels in the heads-up display of FIG. 7A when the viewers are wearing sunglasses, in accordance with an embodiment of the present description.

The charts of FIGS. 8 and 9 show the percent ratio of the reflected luminance with a rotated retarder 45b for both the front-seat passenger (at a skew angle of 0 degrees) and the driver (at a skew angle of 40 degrees) for various angle of retarder rotation. FIG. 8 shows the values measured for passengers not wearing polarized sunglasses, and FIG. 9 shows the values measured for passengers wearing polarized sunglasses.

Looking first at FIG. 8, this chart plots the luminance ratio as seen by a driver at a skew angle of 40 degrees versus the luminance ratio as seen by a front-seat passenger at a skew angle of 0 degrees. For the purposes of FIGS. 8 and 9, "luminance ratio" is defined as the luminance level measured with the retarder (e.g., retarder 45b of FIG. 7A) in place versus the luminance level measured with no retarder. Eight separate plot points, R1-R8, represent various rotation angles (i.e., the value of angle β as shown in FIG. 7A), according to the following:

R1=β is −25 degrees

R2=β is −20 degrees
R3=β is −15 degrees
R4=β is −10 degrees
R5=β is −5 degrees
R6=β is 5 degrees
R7=β is 10 degrees
R8=β is 15 degrees As can be seen by these values, it is possible to increase the driver reflected luminance by over 30% while only dropping the front-seat passenger luminance by about 7%. For example, plot point R5 shows an increase in image luminance by about 32 percent for the driver (40-degree skew angle), while the front-seat passenger (straight-on, zero skew angle) only drops by about 7 to 8%. It is possible, therefore, to use the in-plane rotation of the retarder to attain either a balanced improvement for a two-viewer scenario (large driver luminance increase, small passenger luminance drop) or a very imbalanced improvement providing a significant driver luminance gain of, for example, about 40% while dropping the passenger luminance by 50%. The latter case may be suitable in a scenario where the front-seat passenger side of a wide-format HUD, for example, is intended to be viewed or seen primarily or exclusively by the driver (e.g., to provide driving information and warnings). At the same time a large drop in passenger luminance may reduce passenger distraction since the passenger does not need to see such driver information. Combining this asymmetric polarization-based reflectivity effect with a directional backlight output using prismatic and/or light control technology could further enhance the selective output performance, with a significant benefit of the retarder polarization effect being to maximize the efficiency of the heads-up display output toward the driver.

It should be noted that the exact retarder rotation angles needed to produce an optimal output for a given scenario will also depend on system geometry factors including the rake angle of the windshield as well as passenger look-down and skew angles.

One benefit to the use of the P-polarized light required by the reflective polarizer in the embodiments discussed herein is that, unlike the S-polarized light used by heads-up display systems without a reflective polarizer, the P-polarized images can be seen when a passenger/viewer is wearing polarized sunglasses. Polarized sunglasses are designed to substantially block S-polarized light and substantially transmit P-polarized light. FIG. 9 is a chart plotting the luminance ratio as seen by a driver at a skew angle of 40 degrees versus the luminance ratio as seen by a front-seat passenger at a skew angle of 0 degrees when both passengers are wearing polarized sunglasses. As with the chart of FIG. 8, the chart of FIG. 9 features eight separate plot points, R1a-R8a, representing various rotation angles (i.e., the value of angle β as shown in FIG. 7A), according to the following:

R1a=β is −25 degrees
R2a=β is −20 degrees
R3a=β is −15 degrees
R4a=β is −10 degrees
R5a=β is −5 degrees
R6a=β is 5 degrees
R7a=β is 10 degrees
R8a=β is 15 degrees When both passengers are wearing sunglasses, the heads-up display (such as heads-up display 200c of FIG. 7A) can still be "tuned" to achieve improved luminance for the driver without a correspondingly large drop in luminance for the front-seat passenger. For example, for rotation angle R5a, the increase in luminance for the driver is about 22%, while the drop in luminance for the front-seat passenger is about 12%. As with the chart of FIG. 8, the values shown in FIG. 9 also show that this asymmetrical luminance ratio can be used to achieve a relatively balanced display for both passengers, or can be used to increase the brightness for the driver while significantly dropping luminance for the front-seat passenger (e.g., to "tune" the display biased toward driver information).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. A heads-up display for viewing by an eye of a passenger of a vehicle, comprising:

a windshield comprising a reflective polarizer disposed adjacent to a first outermost glass surface of the windshield;

a display configured to emit an image toward the windshield, the windshield reflecting between 15% and 85% of the emitted image toward the passenger; and a phase retarding plate disposed in an optical path between the display and the windshield;

the windshield configured to receive the image emitted by the display after being transmitted by the phase retarding plate and to reflect at least a portion of the received image as a reflected image toward the eye of the passenger, the phase retarding plate changing a polarization type of the reflected image to improve a viewing characteristic of the reflective image depending on a viewing angle of the eye of the passenger, wherein the phase retarding plate is disposed in a plane substantially parallel to the display and rotating the phase retarding plate within the plane changes the viewing characteristic of the reflected image.

2. The heads-up display of claim 1, wherein the reflective polarizer is disposed between the first outermost glass surface of the windshield and an opposing, second outermost glass surface of the windshield.

3. The heads-up display of claim 1, wherein the reflective polarizer is disposed adjacent to the first outermost glass surface of the windshield, facing away from an opposing, second outermost glass surface of the windshield.

4. The heads-up display of claim 3, wherein any layer disposed on the reflective polarizer and facing an interior of the vehicle has an average thickness of less than about 7 microns.

5. The heads-up display of claim 1, wherein the heads-up display further comprises a first bonding layer bonding the reflective polarizer to the first outermost glass surface.

6. The heads-up display of claim 1, wherein the reflective polarizer is disposed between, and spaced apart from, the first outermost glass surface and a second outermost glass surfaces of the windshield.

7. The heads-up display of claim 1, wherein the phase retarding plate is a half wave plate.

8. The heads-up display of claim 1, wherein tilting a first end of the phase retarding plate at different angles respective to the plane of the display changes the viewing characteristic of the reflected image.

9. The heads-up display of claim 1, wherein the viewing characteristic is a brightness of the reflected image.

10. The heads-up display of claim 1, wherein the viewing characteristic is an amount of unwanted ghosting of the reflected image.

11. The heads-up display of claim 1, wherein the viewing angle of the eye of the passenger is greater than or equal to about 20 degrees.

12. The heads-up display of claim 1, wherein the windshield further comprising a light absorbing layer disposed between, and spaced apart from, the first and second outermost major glass surfaces of the windshield.

13. A display system for viewing by first and second eyes of respective first and second passengers of a vehicle along different respective first and second directions, the display system comprising:

a display configured to form a polarized image for viewing by the first and second eyes, the formed polarized image having a first polarization state;

a windshield comprising a reflective polarizer configured to receive the formed polarized image at a first incident angle and reflect between about 10% to about 60% of the received polarized image along the first and second directions as respective first and second reflected polarized images for viewing by the respective first and second eyes, the first and second reflected polarized images having respective first and second average intensities, the reflective polarizer configured to transmit at least 60% of an incident light having a wavelength comprised by the received polarized image and having a second polarization state orthogonal to the first polarization state; and a retarder disposed in an optical path between the display and the windshield and configured to have its orientation relative to the reflective polarizer changed, the change modifying one of the first and second average intensities by more than 20% and modifying the other one of the first and second average intensities by less than 20%.

14. The display system of claim 13, where in the change in orientation of the reflective polarizer modifies one of the first and second average intensities by more than 30% and modifies the other one of the first and second average intensities by less than 10%.

15. The display system of claim 13, where in the change in orientation of the reflective polarizer increases one of the first and second average intensities by more than 30% and decreases the other one of the first and second average intensities by less than 10%.

16. The display system of claim 13, wherein the display system is a wide-format heads-up display.

17. The display system of claim 13, wherein one of the first and second passengers is a driver of the vehicle.

18. The display system of claim 13, wherein changing the orientation of the retarder relative to the reflective polarizer comprises rotating the retarder within a plane of the retarder.

19. The display system of claim 13, wherein the reflective polarizer is disposed on a first major outermost surface of the windshield facing an interior or the vehicle.

\* \* \* \* \*